US009722473B2

(12) United States Patent
Buschmann et al.

(10) Patent No.: US 9,722,473 B2
(45) Date of Patent: Aug. 1, 2017

(54) CONSTRUCTION MACHINE WITH OIL-COOLED GENERATOR

(75) Inventors: Martin Buschmann, Neustadt (DE); Michael Diesner, Wilhelmsfeld (DE); Philipp Stumpf, Heidelberg (DE)

(73) Assignee: JOSEPH VOGELE AG, Ludwigshafen/Rhein (DE)

( * ) Notice: Subject to any disclaimer, the term of this patent is extended or adjusted under 35 U.S.C. 154(b) by 789 days.

(21) Appl. No.: 13/597,796

(22) Filed: Aug. 29, 2012

(65) Prior Publication Data

US 2013/0051912 A1 Feb. 28, 2013

(30) Foreign Application Priority Data

Aug. 31, 2011 (EP) .................................. 11007087

(51) Int. Cl.
| B60K 25/00 | (2006.01) |
| H02K 9/19 | (2006.01) |
| E02F 9/20 | (2006.01) |
| E02F 9/22 | (2006.01) |
| E01C 19/48 | (2006.01) |
| H02K 7/18 | (2006.01) |

(52) U.S. Cl.
CPC .............. *H02K 9/19* (2013.01); *E01C 19/48* (2013.01); *E02F 9/2095* (2013.01); *E02F 9/226* (2013.01); *H02K 7/1807* (2013.01)

(58) Field of Classification Search
CPC .......... B60K 25/00; B60K 6/485; E01C 19/00
See application file for complete search history.

(56) References Cited

U.S. PATENT DOCUMENTS

| 2005/0036894 | A1 | 2/2005 | Oguri |
| 2009/0102298 | A1 | 4/2009 | Savant et al. |
| 2010/0296868 | A1* | 11/2010 | Braun ...................... B60K 6/40 |
| | | | 404/118 |
| 2012/0053773 | A1* | 3/2012 | Gustavsson ..................... 701/22 |
| 2012/0089288 | A1* | 4/2012 | Kawashima ........... B60K 6/485 |
| | | | 701/22 |

FOREIGN PATENT DOCUMENTS

| DE | 102007012702 A1 | 7/2008 |
| EP | 1199410 A1 | 4/2002 |
| EP | 2256247 A1 | 12/2010 |
| JP | 2001-016827 A | 1/2001 |
| JP | 2004-84470 A | 10/2005 |
| JP | 2010053596 A | 3/2010 |
| JP | 2010133237 A | 6/2010 |
| JP | 2010168825 A | 8/2010 |
| WO | WO 2010130284 A1 * | 11/2010 ............ B60W 19/00 |

(Continued)

OTHER PUBLICATIONS

European Communication for EP 11 007 087.7 dated Jun. 26, 2013.

(Continued)

*Primary Examiner* — Mark Laurenzi
*Assistant Examiner* — Shafiq Mian
(74) *Attorney, Agent, or Firm* — Fish & Richardson P.C.

(57) ABSTRACT

The invention relates to a construction machine such as a road paver with an electric generator. The construction machine comprises a hydraulic oil system for hydraulic functions that also cools the generator.

8 Claims, 2 Drawing Sheets

(56) References Cited

FOREIGN PATENT DOCUMENTS

WO      WO 2010147121 A1 * 12/2010 ............. B60K 6/485

OTHER PUBLICATIONS

English Summary of Official Communication for EP 11 007 087.7 dated Jun. 26, 2013.
European Office Action mailed Sep. 7, 2012, which issued in corresponding EP Application No. 11 007 087.7.
European Search Report, mailed Jan. 9, 2012, which issued in corresponding EP Application No. 11007087.
English translation of Office Action which issued Mar. 1, 2016 in corresponding Japanese Application No. JP2012-188558.
English translation of Office Action which issued Oct. 18, 2016 in corresponding Japanese Application No. JP2012-188558.

* cited by examiner

CONSTRUCTION MACHINE WITH OIL-COOLED GENERATOR

BACKGROUND OF THE INVENTION

The present invention relates to a construction machine with an electric generator and having a hydraulic oil system adapted for cooling the generator. The construction machine can be, for example, a road paver or a feeder for a road paver.

From EP 1 118 714 A2 it is known that there are electric devices with high electric power consumption levels in the road paver. These include, for example, the heating devices and heating rods of the screed for heating the asphalt mixture. In order to supply power to these devices, a powerful electric generator is needed that normally is coupled to and driven by an auxiliary electric drive, for example by a pump transfer gear. The auxiliary drive is driven by a primary drive, for example by a diesel motor. Due to the high level of electric output during operation, such a generator generates a high level of heat of its own, for which reason cooling air is supplied to the generator by means of a fan. Disadvantageous in this is that the fan demands a certain constructed space on the generator and within the construction machine, and the cooling capacity is limited.

It is also known that in motor vehicles and commercial vehicles, another type of electric generator, referred to as a dynamo, is used to generate the vehicle electrical system voltage. Additionally known is that these electric generators are also subjected to different heat sources during operation or that they themselves generate heat, for which reason they have to be intermittently or continuously cooled. On the one hand, the generator is for the most part located close to a combustion engine, on the other hand, it generates a certain heat of its own during operation. In motor vehicles, air cooling of the generator can be sufficient, while liquid cooling is advisable in vehicles with a higher vehicle electrical system voltage. A liquid-cooled generator is known, for example, from DE 30 28 177 C2, in which a generator with a rotor winding with cooling channels in the conductors is described. The cooling channels can be perfused with cooling water.

A further liquid-cooled generator is described in DE 198 54 464 C2. The generator is located in a housing that comprises a ring-shaped gap for cooling fluid.

Disadvantageous in the cited state of the art is that for the most part, electrically conductive water is used in close proximity to electric components.

Known from DE 197 50 379 B4 is a construction unit with an electric generator and a hydraulic pump assembly in which the hydraulic pump assembly is provided to cool the generator. Disadvantageous in this case is that the generator and the pump assembly form a common construction unit and can therefore be separated spatially only with difficulty.

The object of the present invention is therefore to ensure better cooling of an electric generator with the simplest possible means.

SUMMARY OF THE INVENTION

This object is solved according to the invention by means of a construction machine with an electric generator and having a generator and a hydraulic oil system that is employed to cool the generator.

According to the invention, a construction machine with an electric generator comprises a hydraulic oil system for hydraulic functions, wherein the hydraulic oil system is provided for cooling the generator. While it is true that the hydraulic oil has a lower heating capacity than, for example, water, as a result of which the oil stores less heat than does water. Advantageous in the use of hydraulic oil, however, is that this has a higher boiling point than water, as a result of which no additives have to be admixed. A further advantage of the oil is its good electrical insulating property, as a result of which leakage has no negative effect on the electric generator. Because the hydraulic oil system is provided independently of the electric generator in the construction machine and performs further functions within the construction machine, no separate cooling system is needed for the electric generator. The heat introduced into the hydraulic system, and therefore its temperature, is for the most part lower than in a cooling system for a combustion engine.

The generator preferably has a pipe system on its external surface for the cooling, whereby the pipe system is connected to the hydraulic oil system. The more extensive the pipe system is, the greater the heat-conducting surface of the pipe system and consequently the greater the cooling capacity for the generator.

For the greatest possible cooling capacity of the system, the pipe system is manufactured from a material with good thermal conductivity, preferably steel, stainless steel, aluminium or copper.

In order to achieve the greatest possible surface of the pipe system provided for the cooling, the pipe system can have a coil-shape. A double casing, for example, a half-pipe coil, has proven to be especially advantageous. During a cold start, at which time the oil has a high viscosity level, in order to prevent all of the oil from being conveyed at a high pressure through the pipe system of the generator, a pressure limiter can be provided in the pipe system of the generator.

An especially advantageous variant of the invention provides a regulating device for the generator, whereby this regulating device is configured to regulate the output of the generator, along with other tasks. The power consumption of the generator in the event of high temperatures in or around the generator, for example, can consequently be appropriately reduced.

A further advantageous variant of the invention provides an oil tank that holds the hydraulic oil from the pipe system of the generator, whereby the oil tank is further configured to hold the hydraulic oil from the hydraulic system. The use of a shared oil tank reduces the required space so that the construction machine can be constructed in an altogether more compact manner.

It is especially advantageous if a heat exchanger is provided for the cooling of the hydraulic oil of the pipe system and/or of the hydraulic oil of the hydraulic system. The heat exchanger can thereby be used purely as a cooler and can discharge the heat of the hydraulic oil to the surroundings. It would furthermore be conceivable that the heat exchanger is connected to a heating system of the construction machine and that the heat of the hydraulic system is used for heating other components of the construction machine.

For effective and safe operation of the generator, it can be expedient if a device for monitoring the generator is provided, whereby the device ideally is formed for interaction with the regulating device of the generator. In this way, unsafe and inefficient operating states of the generator can be diagnosed and reacted to with contingency measures. For example, the power consumption of the generator could be reduced.

It has turned out that it is especially effective if the pipe system is integrated into a housing of the generator, because air gaps between the pipe system and the generator are avoided. This can be realised, for example, by moulding the pipe system into the housing of the generator.

An especially advantageous variant of the invention provides that the generator is set up to be driven by a combustion engine and/or auxiliary drive. Because the combustion engine for the most part represents the primary drive of a construction machine, the generator can consequently generate electricity throughout the entire operation of the construction machine. In addition, driving the generator with an auxiliary drive arranged between the combustion engine and the generator avoids peaks in the moment of force at the generator input shaft and allows the specification of a suitable operating rotational speed for the generator.

In order to generate a constant pressure in the hydraulic system and the pipe system of the generator, it can be advantageous if an oil pump that generates pressure in the pipe system is provided, whereby the oil pump is furthermore set up to interact with the hydraulic system. A shared oil pump can consequently be used for the hydraulic system and the pipe system of the generator, as a result of which an additional component, and consequently constructed space, can be saved.

It has thereby proven to be especially advantageous if the combustion engine and/or the auxiliary drive is provided for driving the oil pump. The oil pump consequently generates the oil pressure for the hydraulic system of the construction machine and the pipe system of the generator throughout the entire operation of the construction machine.

It can be advantageous if a separate electric motor is provided for driving the oil pump or, in the event that the oil pump is driven directly by the auxiliary drive, a switchable coupling can optionally be provided between the auxiliary drive and the oil pump. The drive of the oil pump can consequently be decoupled from the combustion engine, which reduces the drag losses on the combustion engine. This makes it possible to avoid permanent operation of the oil pump and, more importantly, achieve a situational build-up of the oil pressure both in the hydraulic system and in the pipe system of the generator.

BRIEF DESCRIPTION OF THE DRAWINGS

In the following, advantageous embodiments of the invention are explained in more detail using a drawing. Shown in particular are.

DETAILED DESCRIPTION OF THE INVENTION

Figure 1:
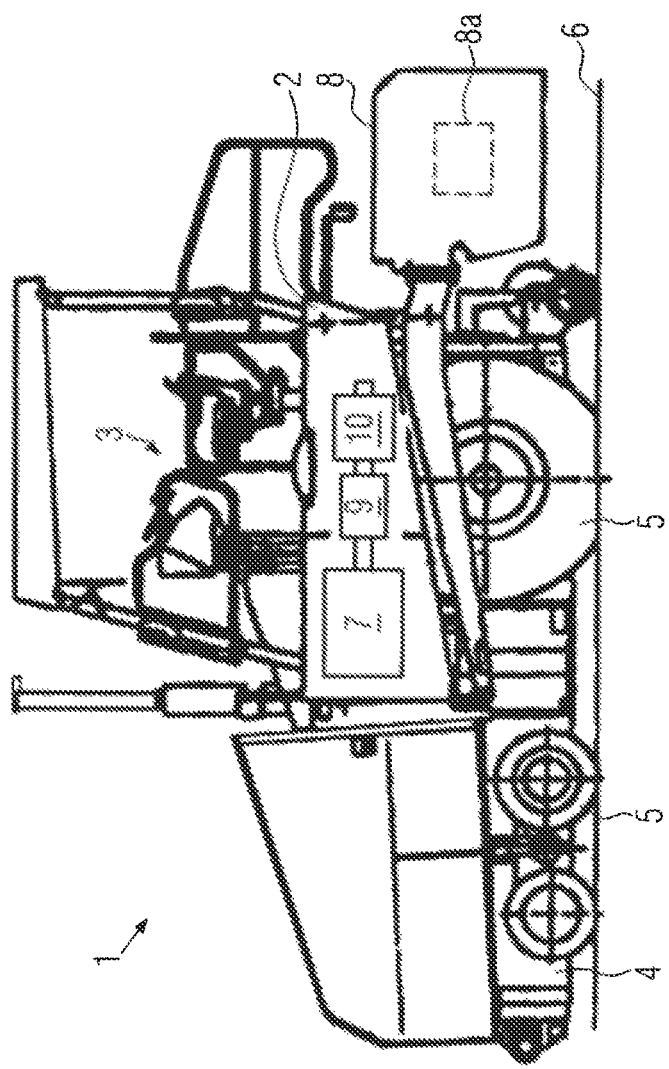
FIG. 1 a side-view of a construction machine according to the invention,
FIG. 2 a schematic depiction of a construction machine with an electric generator according to the invention.
Components that are the same in the figures are given the same reference numbers throughout.

FIG. 1 shows a construction machine 1 according to the invention in the side-view, wherein the construction machine 1 here is a road paver.

The construction machine 1 has a platform 2 that holds a control station 3. The platform 2 is supported by an undercarriage 4. The undercarriage 4 transfers drive forces to the driving surface 6 by means of wheels 5 or crawlers (not shown). For generating the drive forces, the platform 2 has a combustion engine 7 as the primary drive source, which in this case is a diesel motor. A screed 8 with a heating device 8a is mounted on the rear area of the platform 2.

An auxiliary drive 9, which is a pump transfer gear in this embodiment, is connected to the crankshaft of the combustion engine 7. The drive shaft of an electric generator 10 is connected to an output of the auxiliary drive 9 by means of a belt drive 11 or a prop shaft or is also connected directly to the auxiliary drive, in order to generate a voltage for high-power consumers that are a part of the construction machine 1, for example, the heating device 8a of the screed 8. The operating voltage generated by the generator 10 amounts to roughly 400 V. The function of the generator 10 within the construction machine 1 is described in the following with reference to FIG. 2.

Figure 2:
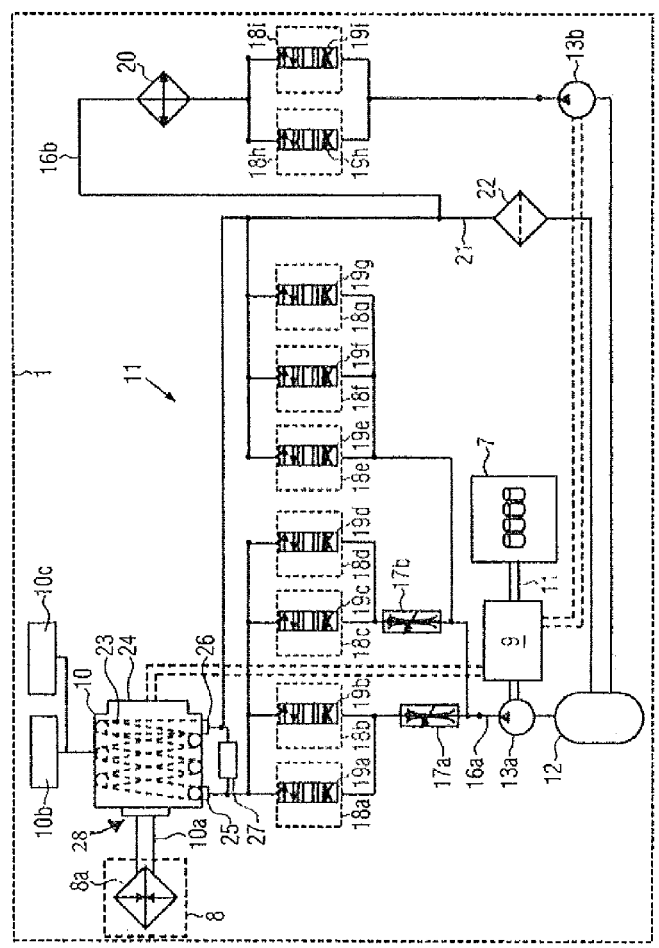

FIG. 2 depicts the construction machine 1 with the electric generator 10 according to the invention. The generator 10 is connected by means of electric lines 10a to high-power consumers, for example, the heating device 8a of the screed 8. The heating device 8a is intended for the heating of an asphalt mixture. The electric power consumption of the heating device 8a is thereby primarily dependent on the width of the screed 8 and optional, additionally connected consumers. The generator 10 has a regulating device 10b and a monitoring device 10c.

The construction machine 1 additionally has a hydraulic system 11 that executes various hydraulic functions for the construction machine 1, for example, the adjustment of actuators. The hydraulic system 11 that comprises at least two different circuits has an oil tank 12 that is shared by the two circuits and that is used for storing hydraulic fluid. The hydraulic fluid in this example is a hydraulic oil, because such oil has good lubricating properties and a suitable viscosity.

The hydraulic oil is conveyed out of the oil tank 12 by two pumps 13a, 13b that are connected to the oil tank 12, whereby each of these two pumps is provided for one of the two different circuits of the hydraulic system 11. The hydraulic pumps 13a, 13b thereby generate a continuous volume flow and have a design that is suitable for this task. Each of the pumps 13a, 13b is driven directly by the auxiliary drive 9. This means that the pumps 13a, 13b can permanently convey hydraulic oil from the oil tank 12 during the operation of the combustion engine 7, and consequently generate a largely constant pressure in the hydraulic system 11.

The hydraulic system 11 additionally has two flow control valves 17a, 17b, that regulate the oil flow constantly at a specifiable level between 4 and 10 liters per minute, preferably however at roughly 8 liters per minute.

The hydraulic system 11 executes various hydraulic functions for the construction machine 1. For this purpose, the hydraulic system 11 comprises hydraulic working components 18a to 18i, e.g., adjusting cylinders for the screed 8 or the undercarriage, that are connected to said hydraulic system 11. Each working component 18a to 18i thereby comprises its own electrically operable valve 19a to 19i. In this embodiment, the working components 18a to 18g are arranged in the circuit of the line system 16a and the working components 18h, 18i are arranged in the circuit of the line system 16b.

The working components 18a to 18g require a constant volume flow, for which reason the two flow control valves 17a, 17b are arranged in the line system 16a between the pump 13a and the working components 18a to 18g. The working components 18h, 18i do not require a constant volume flow, so that no flow control valve is necessary between the pump 13b and the working components 18h, 18i.

In the reflux of the line system 16b, a heat exchanger 20, in this case a cooler, is located between the hydraulic working components 18h, 18i and the oil tank 12 in order to influence the temperature of the hydraulic oil heated by the hydraulic working components 18h, 18i. A reflux line 21 with a filter 22 connects the refluxes of the line systems 16a, 16b to the oil tank 12.

The generator 10 has a coil-shaped pipe system 23 that is moulded into a housing 24 of the generator 10, preferably in the form of a double casing. The pipe system 23 is connected to the supply line of the hydraulic line 16a of the hydraulic system 11 by means of a hydraulic connection 25. Due to the regulation of the flow control valve 17a, a constant oil flow prevails in the pipe system 23 of the generator 10. At one end of the pipe system 23, a further hydraulic connection 26 is provided that is connected to the reflux of the hydraulic line 16a. This is connected to the oil tank 12 as a reflux, so that the hydraulic oil flows back into the oil tank 12.

A pressure limiter 27 is provided to limit the system pressure in the pipe system 23. In this embodiment, the pressure limiter 27 is a pressure limiting valve, comprising a bypass with check valve.

The cooling of the electric generator 10 within the construction machine 1 can proceed as described in the following.

At the beginning of a work assignment, it can be necessary to bring the hydraulic system 11 in the construction machine 1 rapidly to an operating temperature. For example, the hydraulic oil does not reach a viscosity that is ideal for most of the components of the hydraulic system 11 until it has reached a temperature of roughly 70° C. In this operating state of the construction machine 1, the coil-shaped pipe system 23 moulded into the housing 24 of the generator 10 acts to support the hydraulic system 11, because it additionally heats the hydraulic oil with the heat generated by the generator 10.

The hydraulic oil is conveyed both through the hydraulic system 11 and through the coil-shaped pipe system 23 of the generator 10 in a largely constant quantity during the operation of the combustion engine 7 or of the auxiliary drive 9 by the pump 13a.

The hydraulic oil is greatly heated during the further operation of the construction machine 1 due to the introduction of energy from the working components 18a to 18i and the heat generated by the generator 10 that is discharged to the hydraulic oil. The cooler 20 arranged in the reflux of the line system 16b allows a heat emission from the hydraulic oil to the surroundings, so that the temperature of the hydraulic oil in the line system 16b is reduced.

The hydraulic oil e.g. has cooled the generator 10 before it is again conveyed by the pump 13 and supplied to the pipe system 23. If the cooling of the generator 10 by the hydraulic oil is not sufficient and if this fact is detected by the monitoring device 10c, the regulating device 10b can limit the power consumption of the generator 10, as a result of which the generator 10 generates less heat of its own.

Assuming the depicted embodiment, the construction machine 1 with electric generator 10 according to the invention can be modified in multiple ways. For example, the pumps 13a, 13b could be driven by an electric motor arranged separately in the construction machine 1, instead of by the combustion engine 7 or the auxiliary drive 9. The oil pumps 13a, 13b would consequently be controlled as needed, and would not permanently convey oil through the hydraulic system 11 and the pipe system 23 of the generator 10. This would allow an especially advantageous combination with a motor start-stop system.

It would furthermore be conceivable that the coil-shaped pipe system 23 of the generator 10 is connected to a further pre-heating circuit 28, in order to heat the generator 10 more speedily to a suitable operating temperature in the event of cold external temperatures.

The invention claimed is:

1. Road paving machine having an electric generator and further comprising a hydraulic oil system for hydraulic functions and for cooling the electric generator,
   the generator having a coil shape pipe system on an outer surface that is connected to the hydraulic oil system,
   a pressure-generating oil pump in the hydraulic oil system configured to interact with the hydraulic oil system, wherein the oil pump conveys hydraulic oil via the hydraulic oil system through the coil shape pipe system of the generator, the generator is driven by a combustion engine and at least one pressure limiter is provided in the coil shape pipe system,
   the combustion engine being functionally connected to an auxiliary drive which is provided for driving the generator and the oil pump, and
   the coil-shaped pipe system of the generator being connected to a pre-heating circuit in order to rapidly heat the generator to an operating temperature in the event of cold external temperatures.

2. Road paving machine according to claim 1, wherein the pipe system comprises steel, stainless steel, aluminum or copper.

3. Road paving machine according to claim 1, wherein the pipe system is a double casing on the outer surface of the generator.

4. Road paving machine according to claim 1, wherein an oil tank is provided that holds the hydraulic oil.

5. Road paving machine according to claim 1, wherein a heat exchanger is provided for the cooling of the hydraulic oil of the pipe system and/or of the hydraulic oil of the hydraulic oil system.

6. Road paving machine according to claim 1, further comprising a regulating device configured to regulate the output of the generator, and
   a device formed to interact with the regulating device for monitoring the generator,
   wherein if the cooling of the generator by the hydraulic oil is not sufficiently detected by the device for monitoring the generator, the regulating device limits the power consumption of the generator.

7. Road paving machine according to claim 1 wherein the pipe system is integrated into a housing of the generator.

8. Road paving machine having an electric generator and further comprising a hydraulic oil system for hydraulic functions and for cooling the electric generator,
   the generator having a coil shape pipe system on an outer surface that is connected to the hydraulic oil system,
   a pressure-generating oil pump in the hydraulic oil system and configured to interact with the hydraulic oil system, wherein the oil pump conveys hydraulic oil via the hydraulic oil system through the coil shape pipe system of the generator, the generator is driven by a combustion engine and at least one pressure limiter is provided in the coil shape pipe system, the combustion engine being functionally connected to an auxiliary drive which is provided for driving the generator and the oil pump, and further comprising a regulating device configured to regulate the output of the generator,
   a device formed to interact with the regulating device for monitoring the generator, wherein if the cooling of the generator by the hydraulic oil is not sufficiently being detected by the device for monitoring the generator, the regulating device limits the power consumption of the generator.

* * * * *